United States Patent [19]

Okuhara

[11] Patent Number: 5,447,373

[45] Date of Patent: Sep. 5, 1995

[54] LIGHT RECEIVING SECTION FOR AN OPTICAL PYROMETER

[76] Inventor: Seiichi Okuhara, 5-7, Yoyogi 3-chrome, Shibuya-ku Tokyo 151, Japan

[21] Appl. No.: 160,481

[22] Filed: Dec. 1, 1993

[30] Foreign Application Priority Data

Dec. 7, 1992 [JP] Japan .................... 4-351149
Nov. 15, 1993 [JP] Japan .................... 5-307115

[51] Int. Cl.$^6$ .................... G01K 1/12; G01K 1/08; G01J 5/08
[52] U.S. Cl. .................... 374/131; 356/44; 374/140
[58] Field of Search .............. 374/208, 139, 140, 131; 356/44; 266/99

[56] References Cited

U.S. PATENT DOCUMENTS

| | | | |
|---|---|---|---|
| 2,020,019 | 11/1935 | Collins et al. | 374/140 |
| 2,490,617 | 12/1949 | Bristol | 374/140 |
| 2,709,367 | 5/1955 | Bohnet | 374/131 |
| 3,626,758 | 12/1971 | Stewart et al. | 374/131 |
| 4,377,347 | 3/1983 | Hanmyo et al. | 374/139 |
| 4,468,771 | 8/1984 | Zhukov et al. | 374/139 |
| 4,533,243 | 8/1985 | Zhukov et al. | 374/139 |
| 4,657,385 | 4/1987 | Pointer | 356/44 |
| 4,737,038 | 4/1988 | Dostoomian | 374/139 |
| 4,770,544 | 9/1988 | Mossey | 374/131 |
| 4,912,989 | 4/1990 | Cassidy | 374/140 |
| 5,180,228 | 1/1993 | Tarumi et al. | 374/139 |
| 5,277,496 | 1/1994 | Mayer et al. | 374/208 |
| 5,302,027 | 4/1994 | Park | 374/208 |

FOREIGN PATENT DOCUMENTS

| | | | |
|---|---|---|---|
| 0196129 | 8/1986 | Japan | 374/139 |
| 0217129 | 9/1987 | Japan | 374/139 |
| 0263426 | 11/1987 | Japan | 374/139 |
| 1163634 | 6/1989 | Japan | 374/139 |
| 0267426 | 10/1989 | Japan | 374/139 |
| 2045433 | 10/1980 | United Kingdom | 374/208 |

*Primary Examiner*—Diego F. F. Gutierrez

[57] ABSTRACT

A light receiving section of an optical pyrometer enables accurate temperature measurement of molten metal with minimum cost. The light receiving section of the optical pyrometer comprises a cylindrical member 1 made of a paper sleeve 2 with a quartz cap 4 sealed to the front end of the paper sleeve 2 using refractory material 3. An open end of the quartz cap 4 is oriented outwardly with respect to the cylindrical member 1 while the closed end 41 of the quartz cap 4 provides a light transmission window for transmitting radiant rays from the molten metal 24 to the optical pyrometer 21.

3 Claims, 2 Drawing Sheets

LIGHT RECEIVING SECTION FOR AN OPTICAL PYROMETER

BACKGROUND OF THE INVENTION

The present invention relates to an optical pyrometer for optically measuring the temperature of molten metal such as steel, and more specifically to a less expensive and more accurate optical pyrometer.

It is generally difficult to receive radiant rays from molten metal such as steel because the molten steel is always covered with slag. This is the reason why it has been common to use immersion type thermocouples for measuring the temperature of molten steel.

An immersion type thermocouple is made of an alumel-chromel or a platinum-rhodium platinum thermocouple accommodated in a quartz cap at the end of a paper sleeve. Such an immersion type thermocouple can be used only once or twice and is an article of consumption which cannot be used repeatedly.

Such immersion type thermocouples, especially the platinum based thermocouples, are very expensive. However, temperature measurement of molten steel is essential to providing quality control of steel products, thereby requiring considerable expenditures for providing such temperature measurement of molten steel.

SUMMARY OF THE INVENTION

It is therefore an object of the present invention to overcome problems associated with temperature measurement of molten metal using such immersion type thermocouples.

In order to achieve the above object, the light receiving section of an optical pyrometer according to the present invention comprises a cylindrical member and a quartz cap sealingly attached at the end of the cylindrical member using refractory material. The open end of the quartz cap is oriented outwardly while the closed end defines a light transmission window through which radiant rays from the molten metal pass.

DESCRIPTION OF PREFERRED EMBODIMENTS

Figure 1:
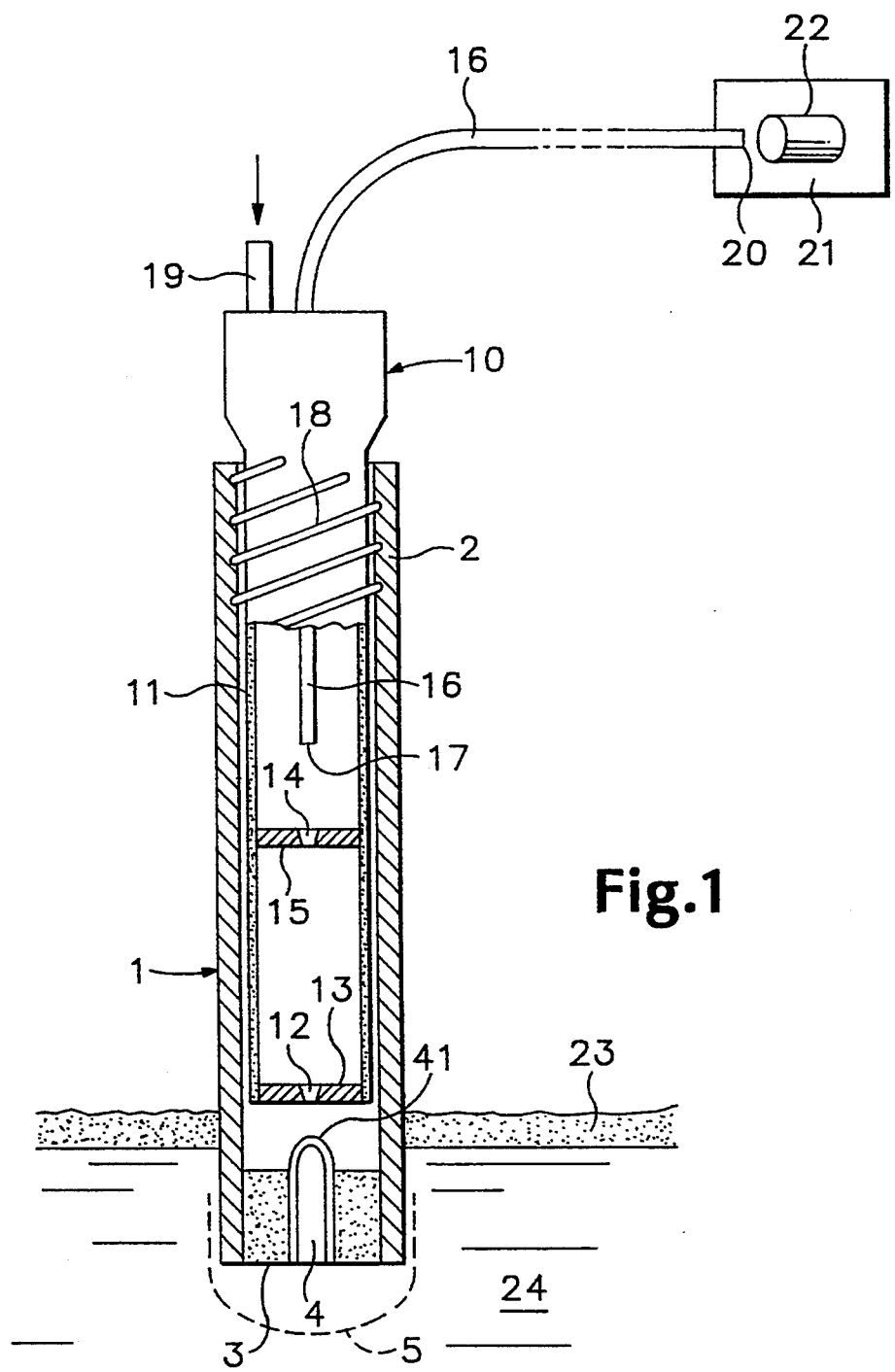
FIG. 1 is a longitudinal cross section view of one embodiment of the light receiving section of the optical pyrometer according to the present invention.

As illustrated in FIG. 1, the light receiving section of the optical pyrometer comprises a cylindrical member 1 and a light receiving rod 10 to be inserted into the cylindrical member 1. The cylindrical member 1 comprises a paper cylinder 2 and a quartz cap 4 sealed to one end of the paper cylinder 2 using refractory material 3. The open end of the quartz cap 4 is oriented outwardly (i.e., downwardly in the temperature measurement condition). Also, the end portion of the cylindrical member 1 is protected by an iron or other metal cap 5.

The light receiving rod 10 to be inserted into the cylindrical member 1 is provided with plates 13, 15 each having a small opening 12, 14 for limiting the field of vision at the end and intermediate portion in a circular sleeve 11. An optical fiber 16 is inserted into the circular sleeve 11 at the rear end. The light incident face 17 at the leading end of the optical fiber 16 is directed to the closed end 41 of the quartz cap 4 by way of the two small openings 12, 14.

On the outer periphery of the light receiving rod 10 at the rear end thereof, there is provided a helical screw 18 so that the light receiving rod 10 can be secured in the cylindrical member 1 by insertion into the paper cylinder 2, thereby forming the cylindrical member 1. Also formed at the rear portion of the light receiving rod 10 is a venting hole 19 through which inert gas or clean air is introduced into the light receiving rod 10.

The rear end 20 of the optical fiber 16 is coupled to an optoelectrical transducer 22 of the optical pyrometer 21, such as a two color ratio pyrometer.

In measuring the temperature of the molten metal, the light receiving rod 10 is inserted into the paper cylinder 2. The front end of the cylindrical member 1 is inserted into molten steel while blowing an inert gas or clean air into the cylindrical member 1 through the venting hole 19. When the front end of the cylindrical member 1 protected by the metal cap 5 reaches the molten steel 24, the metal cap 5 is melted to expose the quartz cap 4.

Although the quartz cap 4 is exposed, it is to be noted that the presence of air in the quartz cap 4 prevents the molten steel 24 from rising to touch the closed end 41 of the quartz cap 4. Radiant rays from the molten steel 24 in the quartz cap 4 are transmitted into the leading end of the optical fiber 16 through the closed end 41 of the quartz cap 4 and two small openings 12, 14 for temperature measurement by the optoelectrical transducer 22 in the optical pyrometer 21.

When the quartz cap 4 touches the molten steel 24, the quartz is devitrified by acidic or alkalic components contained in the molten steel. This prevents uniform transmission of all spectrum components of the rays radiated from the molten steel 24, thereby hurting accurate temperature measurement due to uneven spectrum distribution of the transmitted rays.

It should be noted, however, that the particular arrangement of the quartz cap 4 defining the light receiving window, with the closed end 41 positioned in an upwardly orientation, keeps the molten steel 24 away from the closed end 41, thereby avoiding the undesired devitrification. This assures that all wavelength components of the radiant rays from the molten steel 24 are transmitted to the optical pyrometer 21 for more accurate temperature measurement.

The inert gas or clean air blown through the venting hole 19 into the light receiving rod 10 blows away any smoke or vapor from the burning paper cylinder 2 to maintain the necessary visibility for accurate temperature measurement. Also, the light incident face 17 of the optical fiber 16 is kept clean.

Figure 2:
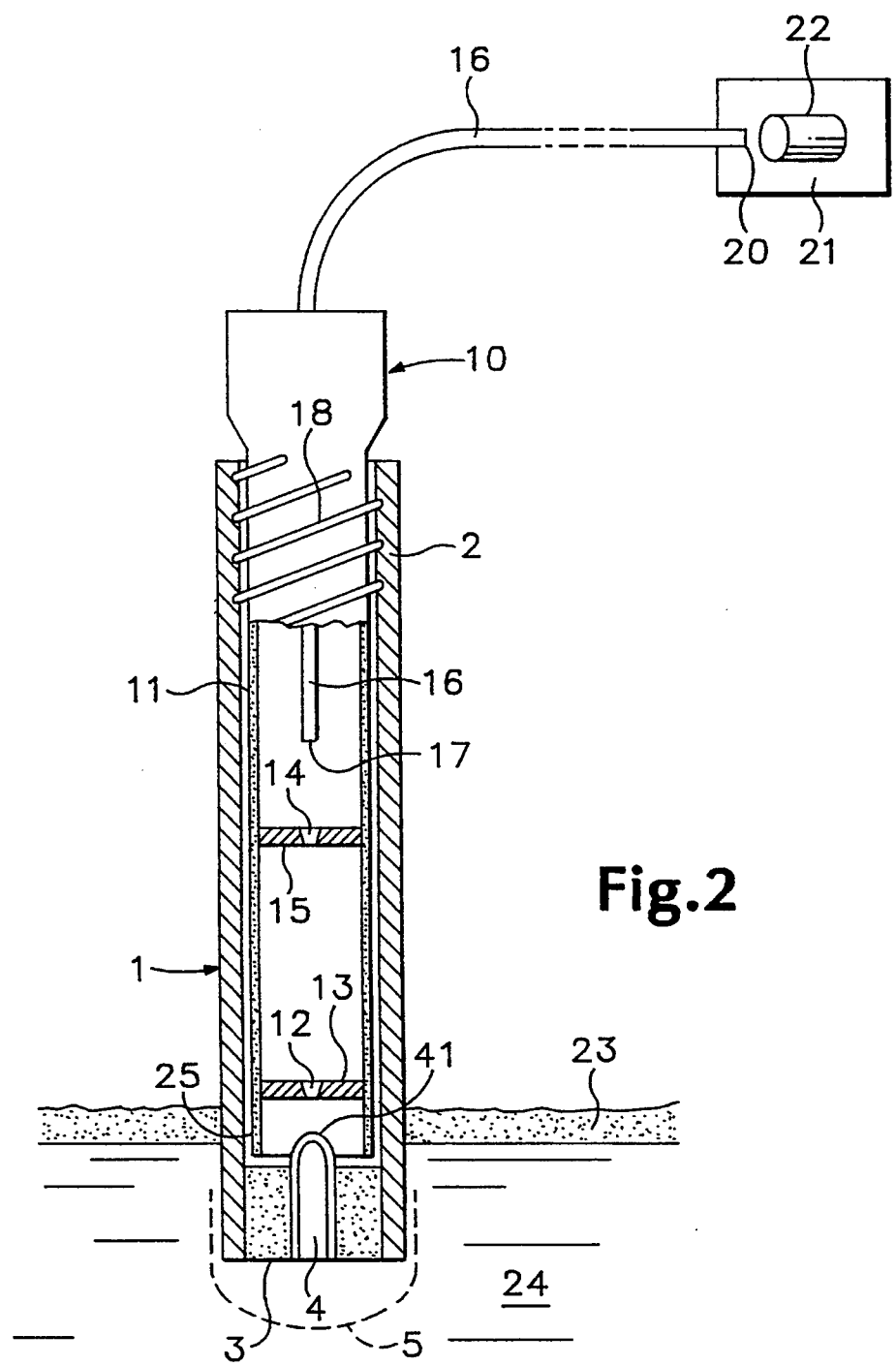
FIG. 2 is a longitudinal cross section view of an alternative embodiment of the light receiving section.

If the front end of the circular sleeve 11 is formed with a hood 25 extending beyond the plate 13 having the small opening 12 as illustrated in FIG. 2, good visibility is maintained even if smoke and vapor from the burning paper sleeve 2 tend to enter the paper sleeve 2. This eliminates the need for venting hole 19 to blow inert gas or clean air.

ADVANTAGES OF THE INVENTION

As understood from the above description of the preferred embodiments according to the present invention, the light receiving section of an optical pyrometer does not use precious metal such as platinum in the cylindrical member 1, thereby making it less expensive and also significantly reducing the cost of temperature measurement because of elimination of an article of consumption.

Also, the particular arrangement avoiding devitrification of the closed end 41 of the quartz cap 4 defining the light receiving window ensures that the radiant rays from the molten steel are transmitted to the optical pyrometer with a high degree of fidelity for more accurate temperature measurement.

What is claimed is:

1. A light receiving section for an optical pyrometer comprising:

a cylindrical member having a front end; and a quartz cap having an open end and a closed end sealed at the front end of said cylindrical member by refractory material with the open end of said quartz cap oriented outwardly with respect to said cylindrical member, the closed end of said quartz cap providing a light transmission window for transmitting radiant rays from a molten metal therethrough, wherein the presence of air in the open end of the quartz cap prevents the molten metal from touching the closed end of the quartz cap.

2. A light receiving section for an optical pyrometer according to claim 1 further comprising a light receiving rod inserted into said cylindrical member for receiving radiant rays from the molten metal as transmitted through said light transmission window.

3. A light receiving section of an optical pyrometer according to claim 2 wherein said light receiving rod includes a hood for shielding radiant rays of the molten metal as transmitted through said light transmission window from smoke or vapor of said cylindrical member.

* * * * *